R. R. CROSBY.
Assignor to F. S. Shirley.
LAMP-CHIMNEY.
No. 7,659. Reissued May 8, 1877.
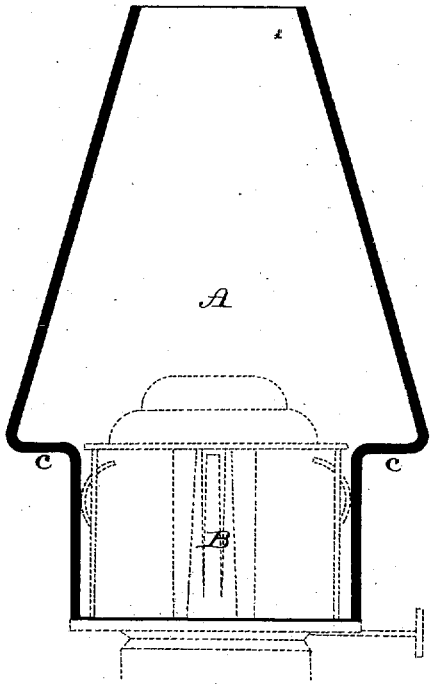
WITNESSES.
J. Wm. Garner
Albert J. de Zeyk
INVENTOR.
R. R. Crosby
per
F. A. Lehmann,
Atty
N. PETERS PHOTO-LITHOGRAPHER, WASHINGTON, D. C.

UNITED STATES PATENT OFFICE

ROBERT R. CROSBY, OF BOSTON, MASSACHUSETTS, ASSIGNOR TO FREDERICK STACEY SHIRLEY.

IMPROVEMENT IN LAMP-CHIMNEYS.

Specification forming part of Letters Patent No. 79,9[illegible]8, dated July 14, 1868; reissue No. 7,659, dated May 8, 1877; application filed April 6, 1877.

*To all whom it may concern:*

Be it known that I, ROBERT R. CROSBY, inventor, of the city of Boston, in the county of Suffolk and State of Massachusetts, have invented certain new and useful Improvements in Lamp-Chimneys; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to an improvement in lamp-chimneys; and it consists in enlarging the chimney at right angles, or nearly right angles, at or nearly on a level with the flame, and giving the upper part of the chimney a conical form from this enlargement to the top, for the purpose of securing a larger and steadier flame, and making a shorter chimney, as will be more fully described hereinafter.

The accompanying drawing represents my invention.

A represents my chimney, which has a circular flange or lip made on its lower end for fitting down over and around the burner. This flange or lip B is here shown as perfectly straight, and adapted to one form of burner only; but it is evident that this part of the chimney may be made with the outwardly-turned flange, so as to fit other common burners. At or nearly on a level with the flame the chimney is abruptly enlarged outward at or nearly right angles to any suitable degree, so as to afford a larger space for the flame to spread in, and this horizontal portion *c* forms a radiating-surface, through which the light is freely reflected downward. From this enlargement the chimney tapers upward toward the top, at any suitable angle, where it may be of any desired size, the sides forming straight or nearly straight lines.

By the above-described construction an unusually large and expanded flame is produced, which is not only very steady, but not easily blown out by a blast of air. The conical contraction upward makes the draft regular and free from eddies, and should a puff of smoke suddenly start upward it is not thrown against the inside of the chimney, but passes out freely without coming in contact therewith.

Having thus described my invention, I claim—

A lamp-chimney having an abrupt or nearly right angled enlargement on, or nearly on, a level with the flame, in combination with the conical sides and contracted opening at the top, substantially as set forth.

In testimony that I claim the foregoing I have hereunto set my hand this 20th day of March, 1877.

ROBERT R. CROSBY.

Witnesses:
CHARLES W. CLIFFORD,
WALTER CLIFFORD.